INVENTOR.
THOMAS W. WINSTEAD
Raphael Semmes
ATTORNEY

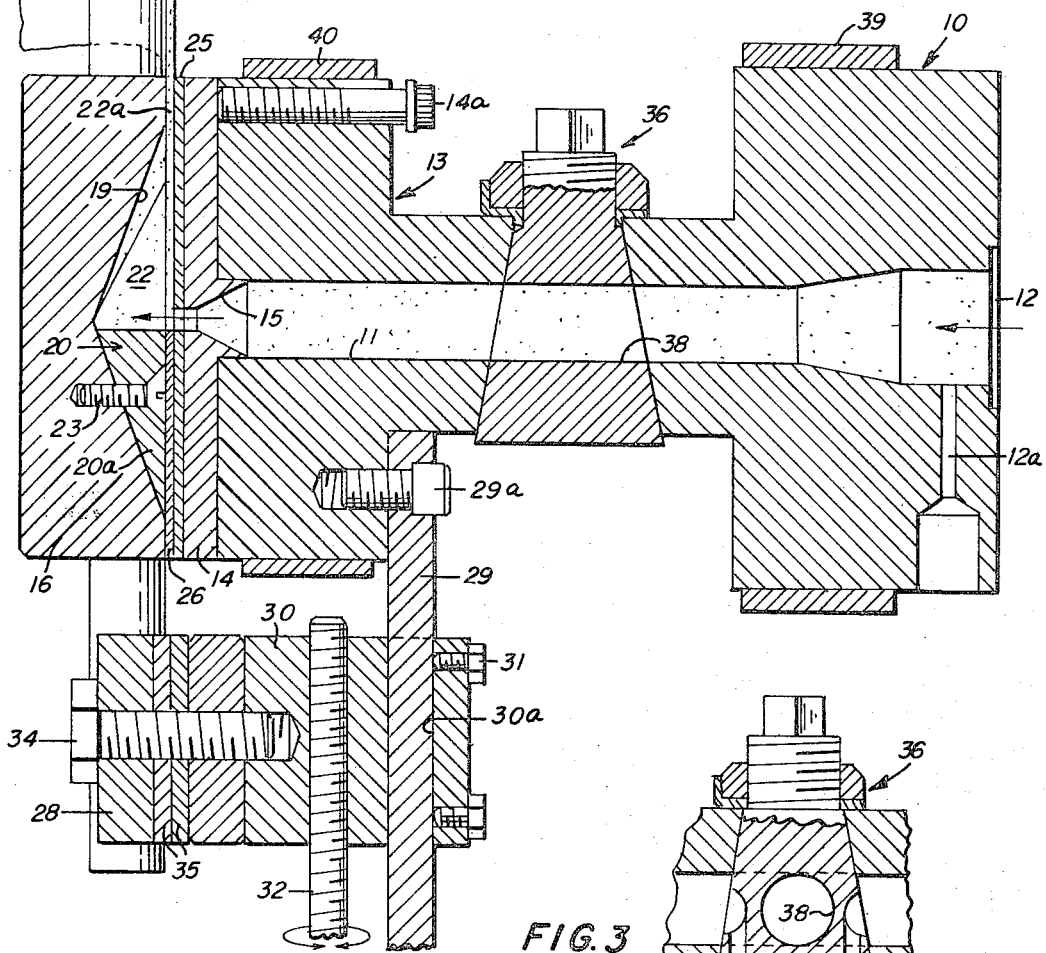

United States Patent Office 3,830,900
Patented Aug. 20, 1974

3,830,900
METHOD OF FORMING FOAMED PLASTIC SHEETS
Thomas W. Winstead, 2 Overlook Lane,
Baltimore, Md. 21210
Continuation-in-part of abandoned application Ser. No. 719,181, Apr. 5, 1968, which is a division of application Ser. No. 475,734, July 29, 1965, now Patent 3,387,328. This application Dec. 7, 1971, Ser. No. 209,390
Int. Cl. B29d 27/00; B29f 3/04
U.S. Cl. 264—51                8 Claims

ABSTRACT OF THE DISCLOSURE

A method forming foamed plastic sheets wherein an expandable thermoplastic strip is first extruded through an orifice defining a radiating path and then spread laterally over an arcuate yoke adjacent the orifice to prevent the formation of wrinkles in the sheets.

---

The present application is a continuation-in-part of Application Ser. No. 719,181, filed April 5, 1968, and now abandoned, which is a division of copending Application Ser. No. 475,734, filed July 29, 1965, now Pat. No. 3,387,-328, issued June 11, 1968. The invention relates to a method for the extrusion and spreading of foamed or cellular thermoplastic materials into a smooth continuous sheet.

BACKGROUND OF THE INVENTION

These foamed thermoplastics may include polymeric resins, more particularly polymers of ethylenically unsaturated monomers, such as polyvinylchloride, polystyrene, polyethylene, polypropylene, or acrylonitrile butadiene styrene, as the basic material to be extruded, and ordinarily volatile liquids, such as pentane or fluorocarbon compounds such as the Freons and including trichlorofluoromethane and dichlorofluoromethane, or other suitable materials which are somewhat soluble in certain thermoplastics, are added to the charging stock. This liquid material will remain in the liquid phase under certain temperatures and pressures, and when the pressure is reduced, the liquids form a gas which, when extruded, causes the thermoplastic material to foam. Sometimes gases, such as nitrogen or carbon dioxide, are used instead and are injected under pressure into the extrusion system.

When foamed plastics are extruded from a conventional die having lips which lie in a flat plane, the resulting extrudate immediately expands upon emergence from the die lip or orifice, and because of the foaming action, this expansion is three-dimensional, i.e., an expansion in length, width and thickness of the sheet, the degree of expansion depending fundamentally upon the resulting density of the material. For example, in extruding a resin which has an original density of 60 lbs. per cubic foot, and by the addition of cells this density is reduced to 3 lbs. per cubic foot, the extrudate expands considerably in all three dimensions as it emerges from the die.

In this particular example, the extrudate would actually grow approximately 2.7 times in each dimension. The growth in length and thickness of the extrudate is actually of no particular concern since the rate of longitudinal expansion can be compensated for by regulating the take-off speed and the thickness of the sheet is relatively small to begin with. However, the width dimension which is relatively wide must expand 2.7 times its original dimension, which brings about a considerable problem. For example, if the extrudate is 3 inches wide at the point of emergence from the die lip, the sheet, after expansion, is over 8 inches in width. Of course, at the center line of the die orifice, there is no particular problem, since this point continues on the center line as the material expands and is taken off. However, each of the edges of an extruded sheet fed from the orifice in a conventional flap lipped die must move rapidly from a point 1&½ inches from the center line to a point over 4 inches from the center line.

Since most of the expansion in a cellular material occurs very close to the die orifice, the geometry of suitable apparatus to cope with this wide lateral expansion problem is very important and critical. If this expansion is not properly accommodated, the extrudate will tend to corrugate or wrinkle, which will result in poor quality of an unuseful product. Where a flat strip or sheet is desired in order to accommodate subsequent processing requirements, such as molding, the need of some apparatus to compensate for problems such as that above referred to becomes of utmost importance.

In tubular extrusion, the wrinkling or corrugating problem is controlled to some degree by the "bubble method." As the tube emerges from the die orifice, it is expanded by internally trapped air or sometimes an internal shoe is employed which helps to remove the wrinkles or corrugations. However, even this method has definite limitations with very low density materials and is not applicable for the high speed extrusion of strips or sheets requiring subsequent operations close to the die orifice where the extrudate is still sufficiently pliable for such operations. As cellular materials expand upon emerging from a die orifice, they cool rapidly, and if subsequent operations are to be performed, they must be performed immediately after emergence from the die lip.

It is therefore the primary object of the present invention to overcome the disadvantages inherent in conventional flat lipped extrusion apparatus where foamed thermoplastic materials are to be extruded.

Another object of the invention is to provide a method of this kind designed geometrically to produce the maximum possible widthwise accommodation of expansion.

Another object of the invention is to provide an extrusion method and apparatus for foamed thermoplastics which insures a uniform distribution of pressure flow at all points along the die lip and thereby eliminates strains or distortions in the extrudate.

A further object of the invention is to provide, in association with an extrusion die, such as above referred to, a mandrel or spreading yoke for the extruded sheet material, the geometry of such mandrel affording the maximum accommodation of the widthwise expansion relative to time.

Another object of the invention is to provide a method of extruding expandable thermoplastic strips so as to accommodate the maximum widthwise expansion of the extrudate and prevent formation of wrinkles thereon.

With the above and other objects in view which will appear as the description proceeds, the invention consists in the novel features herein set forth, illustrated in the accompanying drawings, and more particularly pointed out in the appended claims.

THE DRAWINGS

Referring to the drawings in which numerals of like character designate similar parts throughout the several views:

FIG. 2 is an enlarged sectional view taken on line 2—2 of FIG. 1;

FIG. 3 is a sectional detail of the valve shown in FIG. 2;

DETAILED DESCRIPTION

Figure 1:
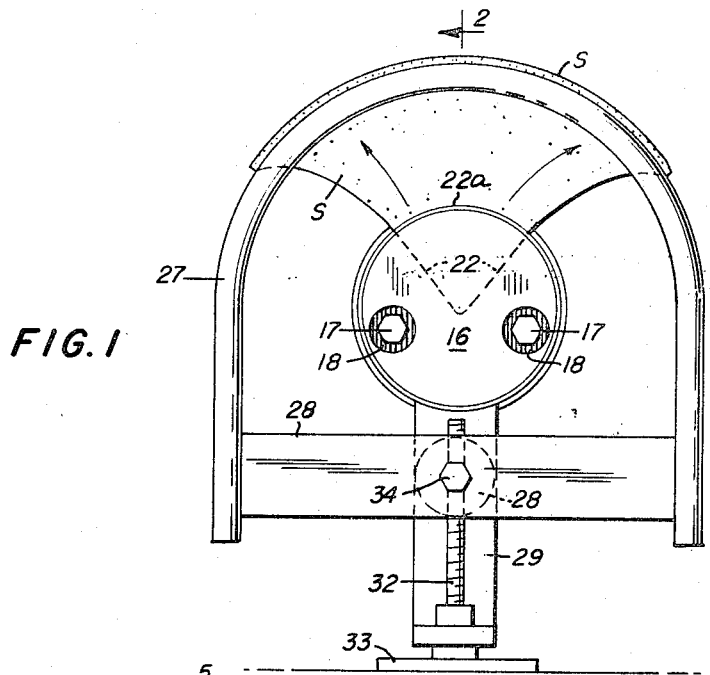
FIG. 1 is an end view of the extrusion die and mandrel showing an extruded sheet of foamed thermoplastic passing over the mandrel.
Figure 4:
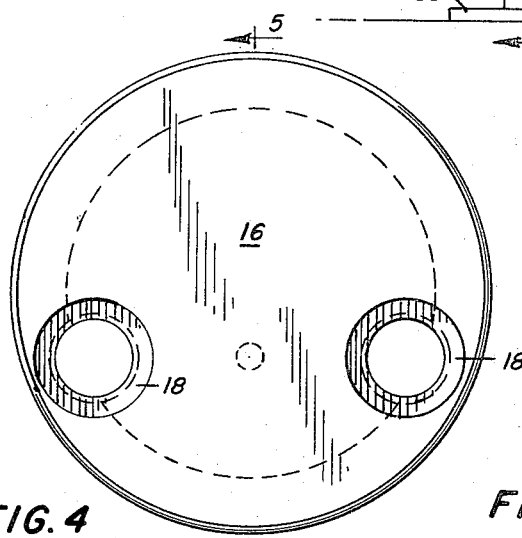
FIG. 4 is a plan view of the end cap of the extrusion die head.

Briefly, the invention involves an extrusion method and apparatus which are basically of a more or less conventional nature, but which, instead of utilizing a die having the usual flat die face, embodies a die lip arrangement wherein the discharge slot or orifice is arcuate in shape and is fed from a feed chamber which diverges from a substantially central inlet point to the arcuate die lips. This arrangement provides a uniform distribution of pressure-flow at all points along the lip of the die and thereby eliminates strains or distortions in the extrudate which, as before pointed out, is not possible with the conventional flat surface die.

Referring first to FIG. 2 of the drawings, 10 represents an extruder body having a longitudinally extending central passageway 11 fed at one end 12 from a suitable source of molten plastic (not shown). The opposite end of the passageway or barrel 11 passes through an extruder head 13 and preferably terminates in communication with a converging inlet port 15 located centrally of a circular, flexible die lip 14.

Figure 5:
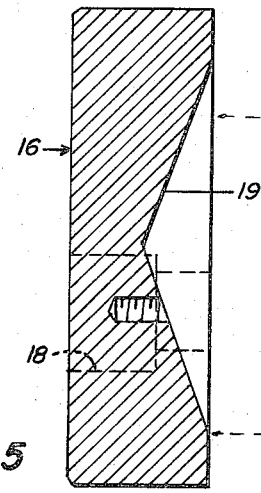
FIG. 5 is a sectional view taken on line 5—5 of FIG. 4.

An end cap 16, also circular in shape, registers with the flexible die lip 14 and is secured in place on the head 13 by means of bolts 17 which, as best seen in FIG. 1, are inset in recesses 18 in the end cap 16, and extend into the head 13 through registering openings in the die lip 14. The inner face of the end cap 16, as seen in FIG. 5, is conically recessed as at 19, providing a feed chamber which is coaxial with the passageway 11 and opening 15. This chamber has diverging side walls which terminate in slightly axially and inwardly spaced relation to the periphery of the end cap 16.

Figure 7:
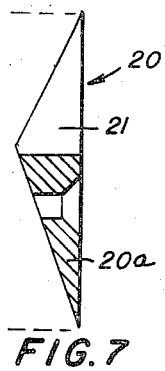
FIG. 7 is a sectional view taken on line 7—7 of FIG. 6.
Figure 6:
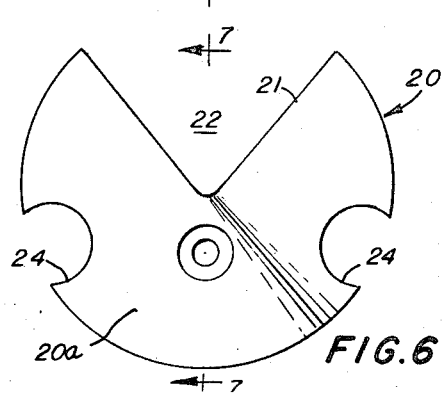
FIG. 6 is a plan view of the internal adaptor for the extrusion die.

An adaptor 20, shown in detail in FIGS. 6 and 7, conforms substantially to the surface contour of the chamber 19, with the exception that the upper portion thereof is provided with a V-shaped cutout area 21 which, when the adaptor is installed concentrically within the chamber 19, provides the diverging radial confines of a substantially fan-shaped plastic feeding reservoir 22 of which the upper portion of the circular lip 14 forms the opposite wall. This reservoir terminates outwardly in an arcuate extrusion orifice 22a. As will be seen in FIG. 2, with the exception of the V-shaped cutout area 21, the remainder of the adaptor is solid, as at 20a, and is secured to the end plate by suitable bolts or screws 23. The adaptor is also provided with openings 24 (FIG. 6) to accommodate the bolts 17 which secure the end plate to the head.

Figure 8:
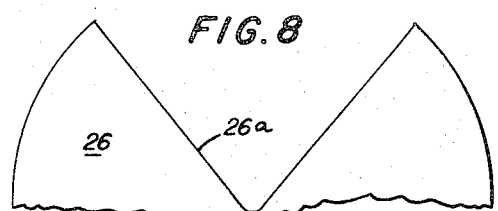
FIG. 8 is a plan view of a shim which is interposed between the end cap and die lip.

Although not essential, a circular washer 25 overlies the face of the flexible die lip 14, and interposed between the washer and the adjacent face of the end cap 16 and adaptor 20, a shim 26 is provided. As seen in FIG. 8, this shim is shaped generally the same as the adaptor 20, having a V-shaped cutout area 26a which registers with the cutout area 21 of the adaptor. However, the shim is of a diameter similar to that of the end cap and extends beyond the radial confines of the adaptor.

Thus, when in place, the boundaries of the cutout area 26a of the shim actually control and define the arcuate length of the die opening 22a which generally incorporates an angle less than 180°.

To facilitate the control of the extrudate after leaving the die lips, a mandrel or spreading yoke 27 is provided adjacent the die lips. This mandrel preferably comprises a vertically disposed, transversely arcuate tube mounted on a cross-bar 28 which is adjustably supported on an upright standard 29 by an adjusting head 30, the upper end of the standard being connected to the extruder head assembly 13 by a bolt or bolts 29a. The adjusting head 30 is provided with a vertical slot 30a which slidably embraces the upright 29, set screws 31 being provided to firmly secure the head 30 in its vertically adjusted position. This adjustment is effected by a vertical adjusting screw 32 which engages complementary threads in the head 30, said screw having adjusting knob 33. Any suitable means may be employed for rotating the adjusting screw. Thus, the head 30 may be moved up or down on the standard 29 and, with it, the cross-bar 28 and the mandrel 27.

A rotary adjustment may be effected by means of an adjusting bolt 34 which passes laterally through the cross-bar 28 and engages threads in the adjusting head 30. Suitable braking or friction discs 35 may be interposed between the cross-bar 28 and the adjusting head assembly to assist in retaining the rotary adjusted position of the mandrel to either one side or the other of the extrusion lips.

Preferably, the mandrel 27 is in the form of a tube to accommodate the passage of a cooling fluid to prevent sticking of the extrudate as it passes over the mandrel. As a further means to prevent sticking, the surface of the mandrel may be coated with a suitable non-sticking material, such as polytetrafluoroethylene.

In order to enable the operator to change die parts without stopping the extrusion equipment feeding the die, a valve 36 is provided in the extruder body to control the flow through the passageway or barrel 11, the valve port 38 being shown in open position in FIG. 2. The closed position of the valve is shown in FIG. 3 where the valve acts as a by-pass valve which, when rotated, bleeds all material entering the die body 10 through the bottom orifice 37 of the valve, while closing off the normal passage through the regular port 38. This feature makes it possible to remove the head bolts 17 so that the shim 26 and the adaptor 20 may be replaced with shim and adaptors of different sizes in order to produce a wider or narrower sheeting. After the end cap is replaced and the new shim is in place, the valve is then turned 90° and the through-flow is restored.

It may also be desirable to provide supplemental band heaters 39 and 40 of any suitable design, surrounding the inlet and outlet ends of the die body 10, as shown in FIG. 2. 12a is a pressure gauge port.

In operation, molten plastic with a dissolved foaming agent, such as pentane, is fed from any conventional source into the inlet end 12 of the passageway 11 under pressure. The foaming agent ultimately causes the foaming of the thermoplastic charging stock. Until the pressurized thermoplastic material emerges from the die orifice 22a, the material remains in liquid phase. However, immediately upon emerging from the die lips or orifice, the release of pressure on the extrusion stock causes the extruded sheet S to undergo a three-dimensional expansion, as previously indicated, and due to the diverging walls of the chamber 19 and the coacting V-shaped recesses 21 in the adaptors 20 and 26a in the shim 26, a uniform distribution of pressure-flow is effected at all points along the arcuate lip, which thereby eliminates strains or distortions in the extrudate. As the extrudate emerges from the die lips and expands, it continues to move radially out to the mandrel or spreader 27, and the geometry of this spreader provides the maximum possible accommodation of the withwise expansion relative to time. The strip S is then passed over the mandrel and may be drawn away at an oblique or acute angle with respect to the plane of the mandrel.

If the mandrel is arcuate, concentric to the arcuate die opening, it is not necessary to take the extrudate away from the mandrel at more than a 90° angle to the plane formed by the mandrel. However, if the take-away angle is less than 90° and becomes acute with respect to the plane of the mandrel, that is, more nearly parallel, the shape of the mandrel may then be formed other than concentric, either by making it elliptical in shape rather than arcuate, or by moving its center line closer to the die opening, which effectively does the same thing. In practice, it has generally been found best to draw the strip or sheet S away from the mandrel in a direction almost parallel to the plane of the mandrel, which is approximately 180° in the opposite direction from which the extrudate flows from the die opening to the mandrel. In the space between the arcuate die orifice and the mandrel, the corrugations or wrinkles of an expanding cellular sheet are very efficiently and quickly removed. Optimum efficiency is achieved when the rate of lateral expansion of the extrudate coincides with the rate of flow between the die orifice and the mandrel; when this condition is achieved no wrinkles or corrugations even begin to form.

As previously pointed out, the die lip 14 is flexible and adjustable. The die lip may be deflected by adjusting screws 14a. The thickness of the die lip 14 is chosen to provide whatever degree of local flexibility may be required for local displacement by the adjusting screws. The thicker this lip, the less localized will be the effect of deflection by the adjusting screw. If more local deflection is required, the die lip 14 would be made thinner or it would be made up of a lamination of several pieces rather than a single piece, in order to provide flexibility. If less deflection is desired, the flexible lip 14 may be made thicker and actually would reduce the number of adjusting screws required. It will be noted that the adjusting screws are positioned so as to be accessible from the rear of the die where they do not interfere with the extrudate as it passes in front of the die, having completed its circuit over the mandrel.

From the foregoing, it is believed that the invention may be readily understood by those skilled in the art without further description, it being borne in mind that numerous changes may be made in the details disclosed without departing from the spirit of the invention as set forth in the following claims.

I claim:

1. In a method of extruding foamable thermoplastic material to form foamed plastic sheets, the steps of passing the extrusion stock through an extruder body while mixing therewith a foaming agent under pressure, maintaining said mixture under pressure, advancing said pressurized mixture along an unobstructed fan-shaped path which diverges laterally in a plane from a central point to a circular-arc extrusion orifice in said plane centered upon said point, extruding said mixture through said orifice radially from said central point as a substantially flat strip to thereby provide a uniform distribution of pressure-flow at all points along said orifice and thus eliminate strains or distortions in the extrudate, and laterally expanding said strip from said orifice substantially radially.

2. The method as claimed in Claim 1, including the step of supporting the underside of the advancing extrudate along an arc approximately parallel to said orifice and laterally spreading the same to prevent formation of wrinkles thereon.

3. In a method of manufacturing foamed thermoplastic sheets, the steps of advancing a laterally expanding substantially flat foamed sheet from an extrusion die and laterally spreading the same over an arcuate mandrel to prevent formation of wrinkles thereon.

4. In a method of extruding foamable thermoplastic material to form foamed plastic sheets, the steps of passing the extrusion stock through an extruder body while mixing therewith a foaming agent under pressure, maintaining said mixture under pressure, advancing said pressurized mixture along an unobstructed fan-shaped path which diverges laterally in a plane from a central point to a circular-arc extrusion orifice in said plane centered upon said point, extruding said mixture through said orifice radially from said central point as a substantailly flat strip directed at substantially right angles to the direction of passage through said extruder body to thereby provide a uniform distribution of pressure-flow at all points along said orifice and thus eliminate strains or distortions in the extrudate, and laterally expanding said strip from said orifice substantially radially.

5. The method as claimed in Claim 4, including the step of supporting the underside of the advancing extrudate along an arc approximately parallel to said orifice and laterally spreading the same to prevent formation of wrinkles thereon.

6. A method of making foamed thermoplastic sheet material, which comprises providing a charge of foamable thermoplastic material in plastic state with a foaming agent under pressure, extruding said material under pressure along an unobstructed fan-shaped path which diverges laterally in a plane from a central point to a circular-arc extrusion orifice in said plane centered upon said point, and laterally expanding said material from said orifice substantially radially.

7. The method as claimed in Claim 6, further comprising spreading the extrudate laterally over an arcuate mandrel.

8. A method of making foamed thermoplastic sheet material, which comprises extruding a charge of foamable thermoplastic material in plastic state with a foaming agent under pressure to form a flat strip, laterally expanding said strip after extrusion, and laterally spreading the strip over an arcuate mandrel at a rate which accommodates the lateral expansion of the strip.

References Cited

UNITED STATES PATENTS 3,670,059    6/1972    Winstead _____ 264—48

PHILIP E. ANDERSON, Primary Examiner

U.S. Cl. X.R.

264—177, 210 R, DIG. 13, DIG. 16; 425—325